United States Patent [19]
Derdyra et al.

[11] Patent Number: 5,280,360
[45] Date of Patent: Jan. 18, 1994

[54] LASER SCREEN CATHODE RAY TUBE WITH BEAM AXIS CORRECTION

[75] Inventors: Nikolai V. Derdyra, Smela, Ukraine; Vladimir I. Kozlovsky, Troisk, Russian Federation

[73] Assignees: P. N. Lebedev Institute of Physics, Moscow, Russian Federation; Principia Optics, Inc., Los Angeles, Calif.

[21] Appl. No.: 901,788

[22] Filed: Jun. 22, 1992

[30] Foreign Application Priority Data

Dec. 26, 1991 [SU] U.S.S.R. .............................. 5016147

[51] Int. Cl.$^5$ ............................................... H04N 3/227
[52] U.S. Cl. ...................................... 358/242; 313/425; 315/379; 315/370; 315/387; 358/237
[58] Field of Search .................. 358/230, 242, 237, 67; 315/379, 387, 382.1, 370; 313/461, 463, 464, 467, 336, 425; 250/396 R, 397; H04N 3/227

[56] References Cited

U.S. PATENT DOCUMENTS

| | | | |
|---|---|---|---|
| 3,182,224 | 5/1965 | Stone et al. | 315/21 |
| 3,267,209 | 8/1966 | Nagamori et al. | 178/5 |
| 3,316,432 | 4/1967 | Smith | 313/75 |
| 3,558,956 | 1/1971 | Bosev et al. | 313/92 |
| 3,959,584 | 5/1976 | Todd | 178/7 |
| 3,986,194 | 10/1976 | Masumoto et al. | 357/18 |
| 3,996,492 | 12/1976 | McGroddy | 313/500 |
| 4,099,092 | 7/1978 | Bristow | 315/10 |
| 4,140,941 | 2/1979 | Uemura | 313/495 |
| 4,160,935 | 7/1979 | Groot et al. | 315/370 |
| 4,291,256 | 9/1981 | Garwin | 315/368 |
| 4,456,853 | 6/1984 | Robinder et al. | 313/421 |
| 4,479,222 | 10/1984 | Hawrylo | 372/45 |
| 4,523,212 | 6/1985 | Hawrylo | 357/17 |
| 4,539,687 | 9/1985 | Gordon et al. | 372/43 |
| 4,565,947 | 1/1986 | Minn | 313/467 |
| 4,568,861 | 2/1986 | Doran et al. | 315/379 |
| 4,571,727 | 2/1986 | Nishizawa et al. | 372/4 |
| 4,626,739 | 12/1986 | Shmulovich | 313/469 |
| 4,634,922 | 1/1987 | Nill | 313/402 |
| 4,695,332 | 9/1987 | Gordon et al. | 437/126 |
| 4,701,789 | 10/1987 | Bonye | 358/65 |
| 4,706,253 | 11/1987 | Su et al. | 372/44 |
| 4,714,956 | 12/1987 | Yin | 358/50 |
| 4,749,907 | 6/1988 | Boatwright et al. | 315/10 |
| 4,812,713 | 3/1989 | Blachard | 315/370 |
| 4,813,049 | 3/1989 | Becla | 372/44 |
| 4,894,832 | 1/1990 | Colak | 372/44 |
| 4,945,223 | 7/1990 | Beauzamy | 250/213 |
| 4,955,031 | 9/1990 | Jain | 372/45 |
| 4,978,202 | 12/1990 | Yang | 350/331 |

FOREIGN PATENT DOCUMENTS

| | | | |
|---|---|---|---|
| 149738 | 7/1981 | Fed. Rep. of Germany | H01S 3/18 |
| 2080609 | 7/1981 | United Kingdom | H01S 3/18 |

OTHER PUBLICATIONS

A. Nasibov, Laser Cathode Ray Tubes and Their Applications, SPIE vol. 893 High Power Laser Diodes and Appl., 1988, pp. 200–202.

A. S. Nasibov and E. S. Shemchuk, Use of Laser Electron-Beam Tubes In Projection Television, Sov. J. Quantum Electron, Sep., 1978, pp. 1080–1085.

Primary Examiner—Mark R. Powell
Attorney, Agent, or Firm—Marshall A. Lerner

[57] ABSTRACT

An electron beam current modulator is provided between a cathode and a laser screen of a cathode-ray tube and has at least three deflecting plates positioned around, and symmetrically with respect to an optical axis of the cathode-ray tube and a diaphragm having an aperture of a regular shape. An electromagnetic control system is provided between the cathode and deflecting plates. A pickup senses position of the electron beam and produces a signal in case of an offset of the electron beam with respect to the optical axis. A video signal source is connected to a carrier generator having an output connected to an input of a phase shifter. The phase shifter has its outputs connected to the deflecting plates to rotate the cross-section of the electron beam in a plane drawn perpendicularly with respect to the optical axis. The apparatus has a control unit having an input connected to the pickup and an output connected to the electromagnetic control system.

14 Claims, 5 Drawing Sheets

LASER SCREEN CATHODE RAY TUBE WITH BEAM AXIS CORRECTION

FIELD OF THE INVENTION

The invention relates to television engineering and deals with high-brightness kinescopes to be used in projection TV systems. More particularly, the invention deals with a method and apparatus for producing an image in a laser screen cathode-ray tube in which laser radiation is generated at any point of a laser screen upon which an electron beam is incident.

BACKGROUND OF THE INVENTION

A prior art cathode-ray tube comprises an evacuated casing which accommodates an electron optic system, a laser screen and a getter pump (Ulasyuk, V. N. Kvantoskopy [Laser Screen Cathode-Ray Tubes] (in Russian). Moscow. "Radio i Svyaz" Publishing House. 1988. p. 105). This is a sealed-off cathode-ray tube, and its electromagnetic focusing lens and a deflecting system are positioned outside the casing. The laser screen is cooled to a liquefied gas temperature, and a high voltage of 50 to 65 kV is applied to a cathode. A signal for modulating electron beam current is applied to an electrode near the cathode and is decoupled by means of an optical coupler. Hairpin cathodes are not used in such cathode-ray tubes because it is not possible to adjust their position. This cathode-ray tube is deficient because of a poor resolution on the laser screen. This disadvantage stems from a large diameter of an electron spot on the laser screen and a narrow modulation frequency band.

Another prior art cathode-ray tube has an electron gun with a tungsten hairpin cathode, a modulator comprising a pair of deflecting plates, a diaphragm and two pairs of correcting plates of a matched length, an electromagnetic focusing lens, a deflecting system, and a laser screen mounted in a toroidal cryostat (Nasibov, A. S. et al. Laser Screen Cathode-Ray Tube. (in Russian). J. Kvantovaya Elektronika. Moscow. 1974. Vol. 1. No. 3. pp. 538-540). This cathode-ray tube can be disassembled. It has a small-diameter electron spot on the laser screen. High voltage is applied to the cathode, and the modulator is positioned downstream an anode which is at a zero potential. One of disadvantages of this cathode-ray tube resides in the fact that the electron beam cannot be adjusted in operation. This adjustment of electron beam is necessary because the position of the point of the hairpin cathode with respect to other electrodes of the cathode-ray tube fluctuates during operation. This cathode drift results in a change in the time during which electron beam passes through the modulator diaphragm. The modulation characteristic of the cathode-ray tube also varies. This instability cannot be completely eliminated by using other types of hairpin cathodes and different cathode materials because the cathode drift is inevitable. Another disadvantage resides in a comparatively high modulator cut-off voltage (200 to 300 V) and high thermal load on the diaphragm. This requires the use of sophisticated and more expensive video amplifiers and results in a shorter service life of the modulator and the tube as a whole.

SUMMARY OF THE INVENTION

It is an object of the invention to provide an apparatus for producing an image in a laser screen cathode-ray tube wherein means are provided for controlling the position of an electron beam with respect to a diaphragm of a modulator to ensure a stable position of the electron beam.

Another object of the invention is to enhance the quality of an image.

Among other objects is to provide a method of ensuring control of the position of an electron beam.

The above and other objects are accomplished in an apparatus for producing an image in a laser screen cathode-ray tube of the type described above in which, according to the invention, the modulator has at least three deflecting plates and a diaphragm having an aperture of a regular shape. It should be noted that the modulator may have more than three deflecting plates. The deflecting plates are positioned symmetrically with respect to the optical axis of the cathode-ray tube. The apparatus has an electromagnetic control system provided between the electron gun and deflecting plates and a pickup for sensing deflection of position of electron beam with respect to the optical axis. A video signal source of the apparatus is connected to a carrier generator which is connected to an input of a phase shifter having its outputs connected to the deflecting plates. The apparatus also has a control unit having at least one input and two outputs, the input of the control unit being connected to the pickup for sensing deflection of position of electron beam with respect to the optical axis and for producing a signal in case of an offset of the electron beam with respect to this optical axis. The outputs of the control unit are connected to the electromagnetic control system.

In the apparatus according to the invention, a video signal is applied to the modulator as an amplitude-modulated signal in the form of a high-frequency sine wave at a carrier frequency which may be several times as high as the upper frequency of the video signal. This high-frequency sine wave is applied to each plate of the modulator with a predetermined phase shift. For this reason the electron beam is not only deflected to the edge of the diaphragm aperture as is the case with prior art cathode-ray tubes, but it also rotates about a center close to the center of the diaphragm which has a circular aperture. The radius of a circle described by the rotating electron beam spot on the diaphragm is determined by the amplitude of a video signal. The center of rotation of the electron spot within the diaphragm plane coincides with the projection of the path of the electron beam at the output of the electromagnetic control system on this plane. In case of a drift of the electron beam the center of rotation of the spot does not coincide with the center of the diaphragm. The center of the diaphragm is generally in the optical axis defined by the axis of symmetry of the focusing lens. If the center of rotation of the electron spot coincides with the center of the diaphragm, electron beam current downstream the diaphragm is not modulated with a high carrier frequency. If these centers do not coincide, which attests to a drift of electron beam away from the optical axis, electron beam current is modulated downstream the diaphragm with a high carrier frequency.

A pickup, e.g., an inductive pickup in the form of a Rogowski loop tuned to the carrier frequency and positioned downstream the diaphragm will produce a signal having its amplitude related to the amount of electron beam drift. In the simplest case a Rogowski loop is a wire loop placed near an electron beam path and embracing a magnetic field appearing around the electron beam. A current in the wire loop is generated under change of the magnetic field generated by change of the electron beam current. It is clear that for improving of sensitivity of a Rogowski loop it should be made of several such wire loops which are wound around the circle that rounds the beam having a preferred shape of a torus. Wire loops should be placed out of electron beam but not so far that the total area inside the inner space of the torus is small. For a larger area the sensitivity of the Rogowski loop will be smaller. Tuning the pick-up transformer to the frequency of the beam modulation will increase the sensitivity and the output signal.

It will be apparent that the apparatus according to the invention ensures a continuous control of electron beam drift in operation. This is very important in high-resolution laser screen cathode-ray tubes in which a high resolution is mainly achieved by means of hairpin cathodes. The hairpin cathodes are known to drift to impair resolution. The electron beam is adjusted in prior art cathode-ray tubes when the cathode-ray tube is not in operation, i.e., in absence of a video signal. Image quality in such devices may become much poorer during a display of a batch of information (e.g., a videotape). In this case currents are adjusted in electromagnetic adjusting coils of an electromagnetic control system to align electron the beam with the optical axis.

The electronic control system preferably has a pair of electromagnetic adjusting coil systems, and each coil system is connected to one of the outputs of the control unit. This allows an independent control of position of electron beam to be carried out in two axes.

It is preferred that an electron beam current pickup be provided between the deflecting plates and the diaphragm. A variable power supply is connected to the cathode and has a control input. The control unit has an auxiliary output connected to the control input of the variable power supply. This allows full current of the electron beam in the plane of the diaphragm to be controlled in operation. Current pickups can be used to measure the electron beam current at complete cut-off of electron beam, e.g. during a blanking pulse. Such pickups must be electrically insulated from the tube casing, and heat removal from the pickup would present a problem in prior art cathode-ray tubes. Since the electron beam is rotated in the apparatus according to the invention, thermal load on the pickup is much lower. For this reason, there is no problem in providing a current pickup for controlling electron beam current. It should be also noted that, among other things, thermal conditions of the diaphragm are less critical in the apparatus according to the invention because the diaphragm is uniformly heated due to the rotation of the electron beam. A differential inductive pickup may also be used, e.g., a differential Rogowski loop which generates a signal at the carrier frequency proportionally to the electron beam current. Placing the current pickup between the deflecting plates and the diaphragm reduces thermal load on the pickup.

DESCRIPTION OF THE DRAWINGS

The invention will now be described with reference to non-limiting specific embodiments illustrated in the accompanying drawings, in which identical parts and components of an apparatus according to the invention are shown at identical reference numerals and in which:

FIG. 1b shows an alternative embodiment of the apparatus of FIG. 1a;

FIG. 4 is another embodiment of the apparatus shown in FIG. 1a;

DESCRIPTION OF PREFERRED EMBODIMENTS

Figure 1A:
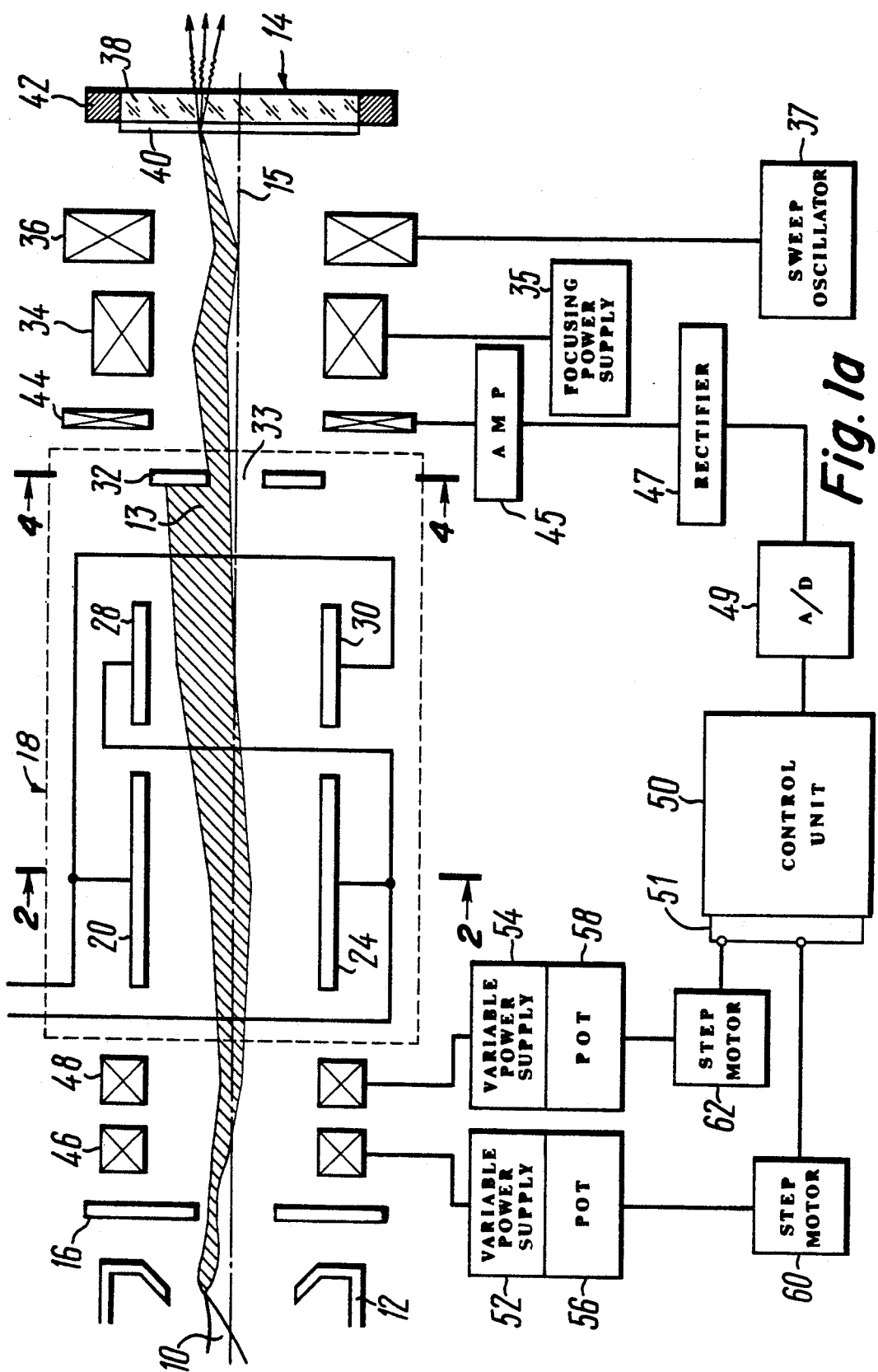
FIG. 1a shows a schematic view of an apparatus for producing an image in a laser screen cathode-ray tube according to the invention with a cathode-ray tube shown without a casing.

With reference to FIG. 1(a,b), an apparatus for producing an image in a laser screen cathode-ray tube comprises a cathode-ray tube which is schematically shown without a casing and which has an electron gun with a hairpin cathode 10 and a focusing electrode 12 designed for producing an electron beam 13 directed at a laser screen generally shown at 14 and positioned at the opposite end of the cathode-ray tube. Electron beam 13 extends along an optical axis 15 of the cathode-ray tube. The cathode-ray tube has an anode 16 which defines an accelerating gap with cathode 10 connected to a high-voltage power supply having a filament voltage supply and a bias voltage supply. The latter is connected to focusing electrode 12. The high-voltage power supply is not shown in FIG. 1(a,b). Accelerated electron beam 13 passes through an electron beam current modulator generally shown at 18. The modulator is provided between anode 16 and laser screen 14 and has deflecting plates 20-26 (FIGS. 1(a,b) and 4), correcting plates 28-30, and an aperture diaphragm 32 having an aperture 33 of a regular shape (FIGS. 1(a,b) and 2). The shape of the aperture should be regular to sense changes in position of an electron beam. Any deviation of regularity of the shape of the diaphragm aperture can cause an incorrect signal indicative of a change in position of the electron beam.

In this specific embodiment aperture 33 is circular. If this aperture is non-circular, a high frequency component will be present in the electron beam current even if the electron beam has not drifted away from the optical axis. In such case it would be difficult to follow up the drift of the electron beam. Four correcting plates are used, but only two of them are shown in the drawing. It should be noted that correcting plates 28-30 are not necessarily required. An electromagnetic focusing lens 34 and an electromagnetic deflecting system 36 are provided in the path of electron beam 13 between diaphragm 32 and laser screen 14. Electromagnetic focusing lens 34 is connected to a focusing power supply 35, and electromagnetic deflecting system 36 is connected to a sweep oscillator 37. Laser screen 14 generally comprises a transparent support 38 attached to a screen structure 40 which is in the form of an optical cavity having an active semiconductor member comprising a single-crystal wafer. Support 38 is mounted in a casing of the cathode-ray tube (which is not shown) and has a cooling means generally shown at 42. All the above-described components of the cathode-ray tube are of conventional type and their design and materials do not have any material bearing on this invention with the exception of deflecting plates 20-26. There are four deflecting plates 20, 22, 24, 26 (FIG. 2) in this embodiment, and these deflecting plates are positioned symmetrically around optical axis 15 of the cathode-ray tube as can be seen in FIG. 2. It should be noted that there should be at least three deflecting plates for the purposes to be described below. As shown in FIG. 1(a,b), the apparatus according to the invention has a pickup 44 for sensing of deflection of position of electron beam 13 with respect to optical axis 15 in operation of the cathode-ray tube and for producing a signal in case of an offset of the electron beam and an electromagnetic control system 46, 48. Pickup 44 for sensing of deflection of position of electron beam 13 with respect to optical axis 15 is provided downstream diaphragm 32, and electromagnetic control system 46, 48 is located between anode 16 of the electron gun and modulator 18. Pickup 44 is in the form of a Rogowski loop. In other words, this pickup is an inductive pickup tuned in resonance with a carrier frequency modulated with a video signal as described below.

Figure 1B:
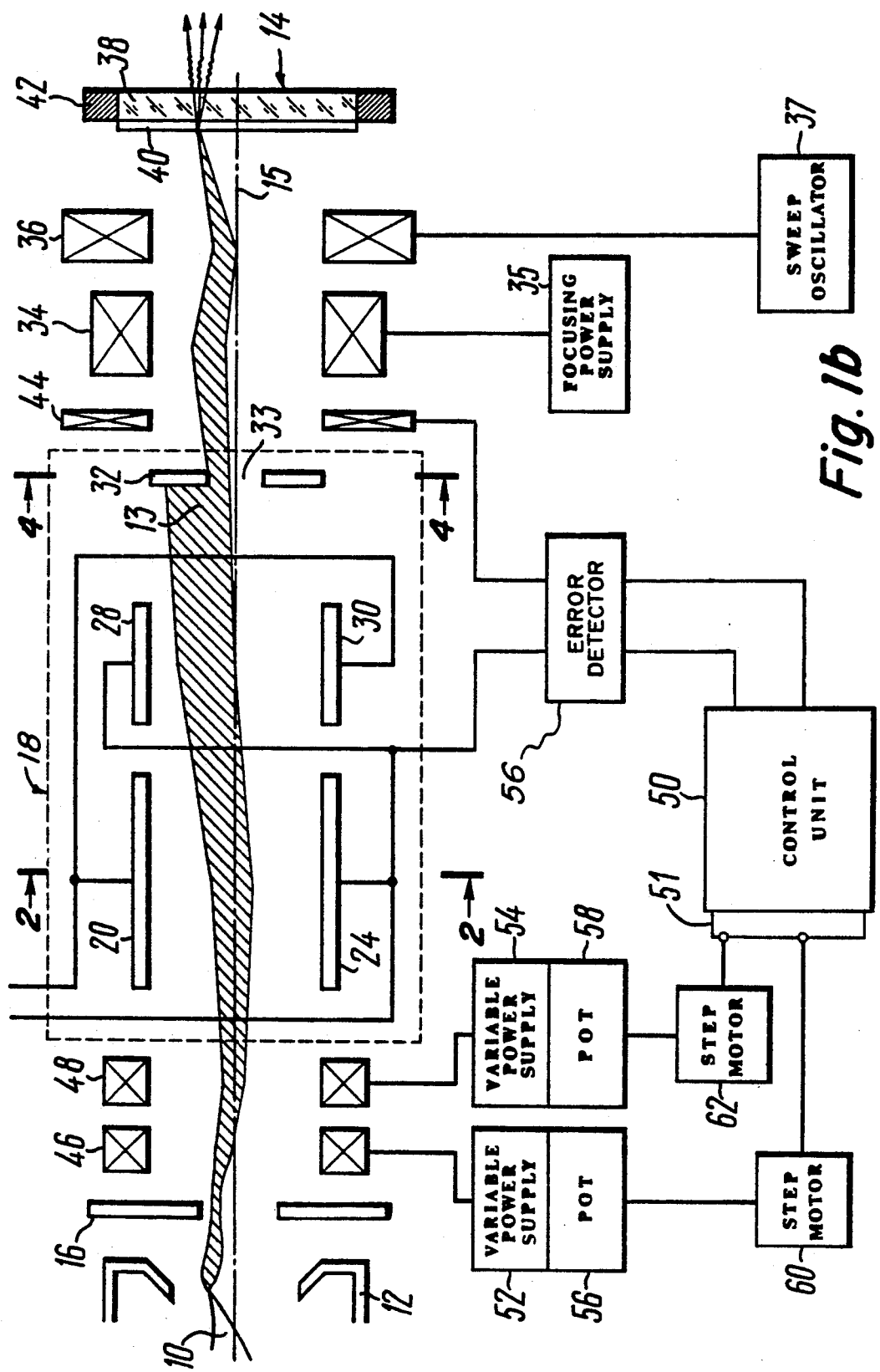
Figure 2:
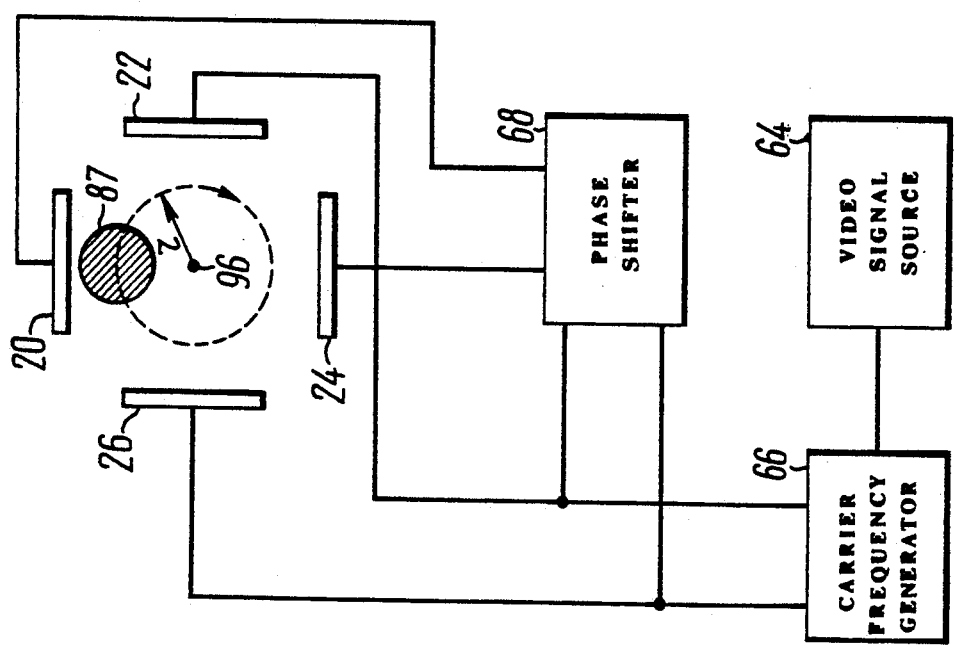
FIG. 2 is an enlarged sectional view taken along line II—II in FIG. 1(a,b) or FIG. 4 which shows the position of deflecting plates and diagrammatically shows their connections to a video signal supply.

In the specific embodiment shown in FIG. 1a, pickup 44 is coupled to electromagnetic control system 46, 48 via an amplifier 45, a rectifier 47, an analog to digital converter 49, and a control unit 50 having an output 51 connected to coils 46, 48 of the electromagnetic control system. Control unit 50 has its output 51 (digital or analog) coupled to controllable power supplies 52, 54, acting as power amplifiers which are connected to coils 46, 48. It will be understood that control of position of electron beam 13 with respect to optical axis 15 may be effected by different means. It will be apparent that control unit 50 can be constructed with a built-in programmed control means for controlling and timing operation of individual components and circuits of control unit 50 in a known manner. Such control units and their built-in algorithms are well known to those skilled in the art and, a specific design of control unit 50 does not have material bearing on this invention (cf., e.g., Diakonov, V. P. Spravochnik Po Algoritmam I Programmam Na Yazyke BASIC Dlya PC. [Handbook of Algorithms and Software in BASIC for PC]. Moscow. "Nauka" Publishing House. 1989. p. 99). In the case when control unit 50 has a built-in programmable control means, it first delivers a test output signal to variable power supply 52 of coil 46 of the electromagnetic control system. Following the output signal, if the resulting input signal of control unit 50 is decreased, the built-in programmable control means delivers an output signal of the same sign as the test signal. If after delivering the test output signal to variable power supply 52 of coil 46 the input signal of control unit 50 increased, a built-in programmable control means delivers an output signal of the opposite sign with respect to the test signal sign up to a level that results in an increase of control unit 50. Thus the position of the electron beam with respect to the optical axis along one of the transverse directions (for example the x-axis) and a corresponding minimum input signal of control unit 50 is found. After the first control step is over, the built-in programmable control means sends a command for producing a next test output signal of control unit 50 which goes to variable power supply 54 of coil 48 of the electromagnetic control system. A position of electron beam along other transverse direction (Y-axis) corresponding to a minimum of input signal of control unit 50 is found by the same manner as mentioned previously. This procedure results in replacing the center of rotation of the electron spot with the center of the diaphragm.

It should be noted that in the embodiment shown in FIG. 1a, the pickup 44 controls only a displacement of electron beam 13 with respect to optical axis 15 and this demands using complete built in programmable control means for adjusting electron beam 13. Another embodiment of a device for adjusting the electron beam is described in FIG. 1b. In this case additionally a phase detector is implemented in the error detector 56 so that the outputs signals are connected with control unit 50. The phase detector in the error detector 56 having an input connecting with the pick-up coil 44 output and an input connecting with one of deflecting plates 20 through 26. For example, plate 24 deflects the electron beam along the X-axis. An output signal of the phase detector is proportional to the difference of oscillation phases on carrier frequency of input signal from the deflecting plate 24 and input signal from pickup 44.

Since the flight time is known of the electron beam from correcting plates 28 to 30 to the pickup 44 (from deflecting plates 20 to 24 to the pickup 44 if modulator 18 does not have correcting plates 28 to 30), which induces a fixed amount of phase shift, the deflection of electron beam 13 can be determined with respect to optical axis 15 as well as its position in the following manner. The flight time $t_e$ is subtracted from the measured time difference of the oscillation phase on carrier frequency of input signals of phase detector $t_m$. This value is multiplied by $360°/T_c$ wherein $T_c$ is a period of carrier frequency oscillation. The resulting value $\alpha$ yields the angle between the direction of displacement of the electron beam with respect to the optical axis and perpendicular to a deflecting plate 24 connecting with the phase detector. The control unit 50 generates an output signal proportional to an amplitude of the input signal from pickup 44. This signal multiplied by sine $\alpha$ in control unit 50 goes to variable power supply 52 to adjust electron beam 13 along the X-axis and simultaneously this signal which is multiplied by cosine $\alpha$ goes to variable power supply 54 to adjust electron beam 13 along the Y-axis. The error detector 56 can be constructed to provide as its outputs the absolute value of the error and the phase shift, as discussed above, or the actual analog error signals for X-axis and Y-axis appropriately. It is important to note that the two outputs of the error detector 56 define a point in a two dimensional diaphragm plane. In this case control unit 50 may not have a built-in programmable control means because it is known to which adjusting signal is necessary to send to coil 46 or 48 from control unit 50. Unit 50 can be constructed as a simple analog feedback loop built to minimize the error signal from the pickup.

As shown in FIG. 2, the apparatus according to the invention has a video signal supply 64 connected to a carrier generator 66 which has its output connected to deflecting plate 26 (FIG. 2). The apparatus also has a phase shifter 68 which has its input connected to the output of carrier generator 66 and its outputs connected to the other deflecting plates 20, 22, 24. It is understood that the video signal at the deflecting plates is phase-shifted to rotate electron beam 13 shown as a shaded circlet 87 in FIG. 2. It is understood that in the general case the number of outputs of the phase shifter is equal to the number of the deflecting plates less one. But if modulator 18 has an even number of deflecting plates the carrier generator may give two signals having opposite phase (pair-phase signal). In this case these signals are served to two opposite deflecting plates and to two inputs of the phase shifter. Outputs of the phase shifter are connected to the remaining deflecting plates. In this case the number of outputs of the phase shifter is equal to the number of deflecting plates minus two. It should be noted that the phase shifter may have the number of outputs equal to the number of the deflecting plates as well. In this case the output of the carrier generator is connected only to the input of the phase shifter. It will be apparent that with this circuitry a carrier frequency will be directly fed to one of the outputs of the phase shifter. In any case, a specific design of this part of the electric circuit does not have a material bearing on the invention. It is only important that voltage be applied with a phase shift to the deflecting plates.

Figure 3:
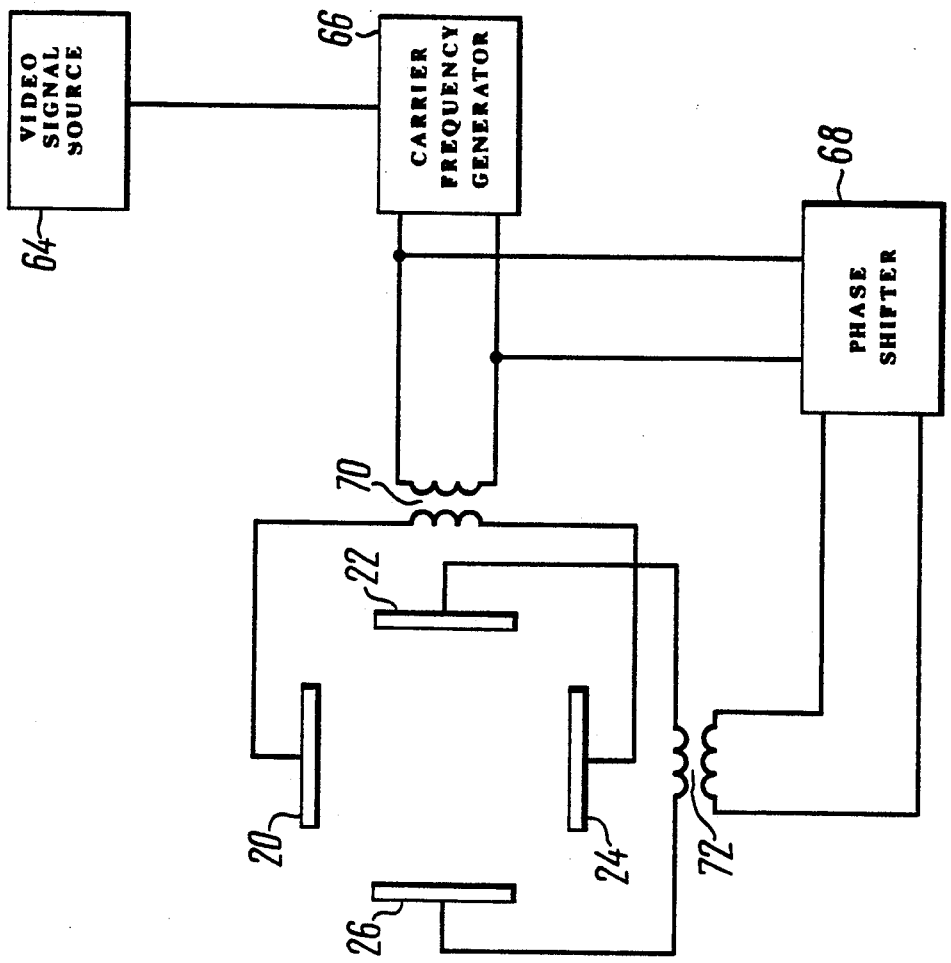
FIG. 3 is a schematic electric diagram of connections of deflecting plates in the apparatus shown in FIG. 1(a,b) or FIG. 4.

The electric circuit diagram showing connections of deflecting plates 20–26 to video signal supply 64 is given in detail in FIG. 3.

With reference to FIG. 3, the apparatus has a first resonance transformer 70 and a second resonance transformer 72. The primary winding of first resonance transformer 70 is connected to carrier frequency generator 66 giving out a pair-phase signal. The primary winding of second resonance transformer 72 is connected to phase shifter 69. The secondary windings of resonance transformers 70, 72 are connected to opposed deflecting plates 20, 24 and 22, 26, respectively. With this construction, capacitance of deflecting plates 20–26 of modulator 18 does not determine the video channel bandwidth. The video channel bandwidth can be as wide as necessary. A video signal is applied to the deflecting plates 20–26 of modulator 18 via high-frequency resonance transformers 70, 72 having the secondary windings tuned in resonance with the carrier frequency together with the capacitance of plates 20–26 and connecting leads (not shown). In this case rather low requirements can be imposed upon a video amplifier (not shown) of video signal source 64. The desired angles of deflection of electron beam 13 can be achieved with a smaller length of modulator 18 owing to resonance transmission of the video signal. This allows the cathode-ray tube to be made shorter.

Figure 4:
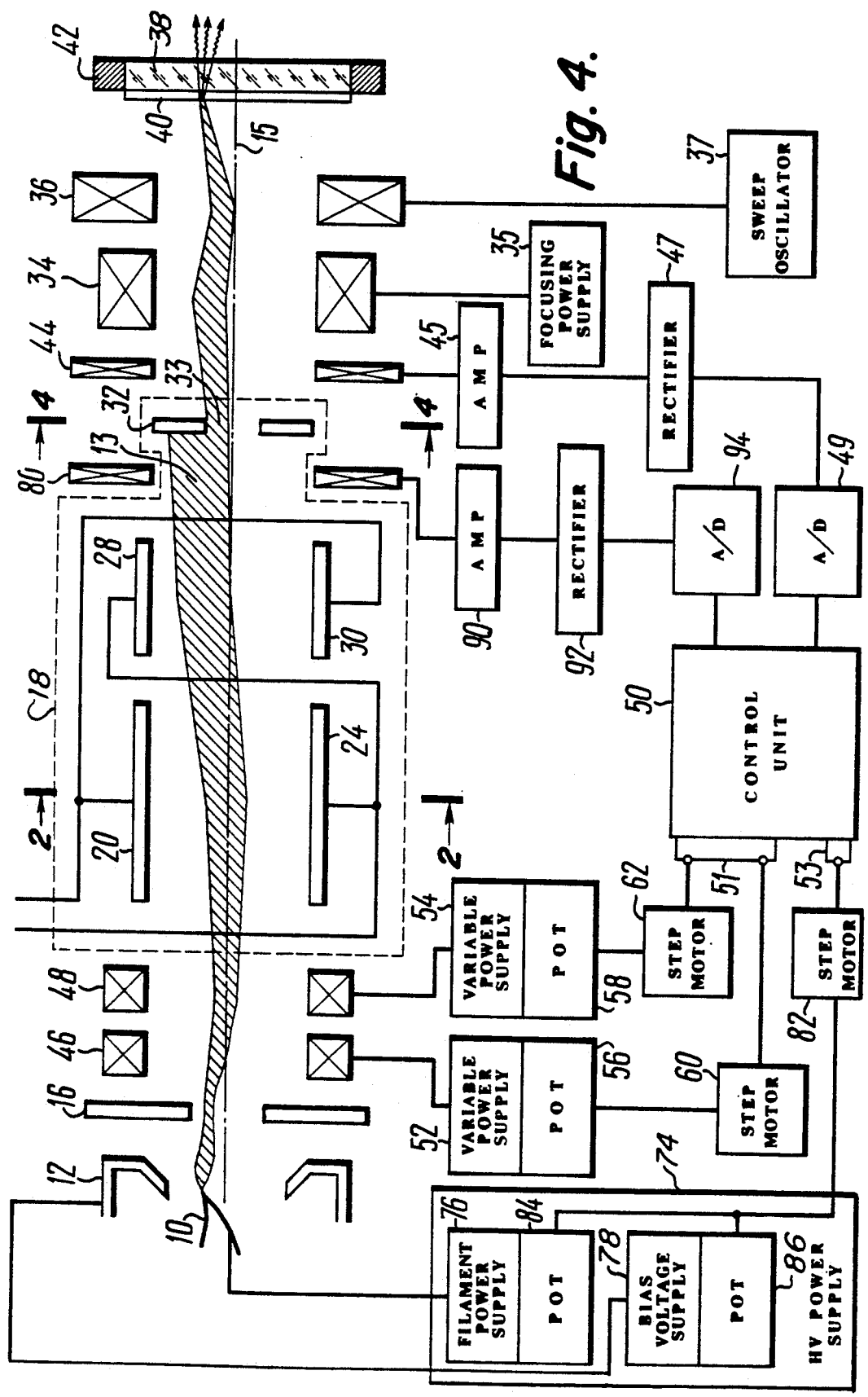

Another embodiment of the apparatus for producing an image in a laser screen cathode-ray tube shown in FIG. 4 is constructed along the same lines as that shown in FIGS. 1a, 2. The difference resides in the fact that a variable high-voltage power supply 74 is provided which has a control input and which includes a filament voltage supply 76 connected to hairpin cathode 10 and a bias voltage supply 78 connected to focusing electrode 12. The cathode ray tube has an electron beam current pickup 80 provided upstream diaphragm 32 and downstream modulator 18. This pickup may be in the form of a current collector or in the form of a Rogowski loop. Pickup 80 is designed for measuring the full current of electron beam 13 upstream diaphragm 32. The output of pickup 80 is connected to the auxiliary input of control unit 50 via amplifier 90, rectifier 92, and analog to digital converter 94. If the signal from pickup 80 differs from the preset value in control unit 50, the difference between the signal from pickup 80 and the preset value is feed via output 53 to variable filament voltage supply 76 and variable bias supply 78 of the high voltage supply 74. The output of filament power supply 76 is connected to hairpin cathode 10 and the output of bias voltage supply 78 is connected to focusing cathode 12 to thereby correct any undesired deviation of the electron beam 13.

It is understood that control unit 50 is built around a microprocessor having a reference value setter for comparing signals received from pickup 80 with a preset reference value and for generating command signals to variable power supplies 76, 78 of the electron gun. The output 53 of control unit 50 may be any suitable digital or analog output. Control systems including pickups and control units are well known to those skilled in the art and are not described in detail herein as they do not have material bearing on this invention.

Operation

Operation of an apparatus according to the invention will be described in detail, and the method according to the invention will be apparent from the description that follows.

In operation of the embodiment of the apparatus according to the invention shown in FIG. 1(a,b) cathode 10 which is at a high negative voltage (high-voltage power supply is not shown in FIG. 1(a,b)) emits electrons. Focusing electrode 12 and anode 16 form narrow electron beam 13 directed at laser screen 14 for producing an electron spot on the laser screen. Electron beam 13 is modulated in modulator 18, and diaphragm 32 ensures sharpness. Focusing and deflecting systems 34,35,36,37 allow movement of electron spot on laser screen 14 to produce an image in a known per se manner.

Figure 5B:
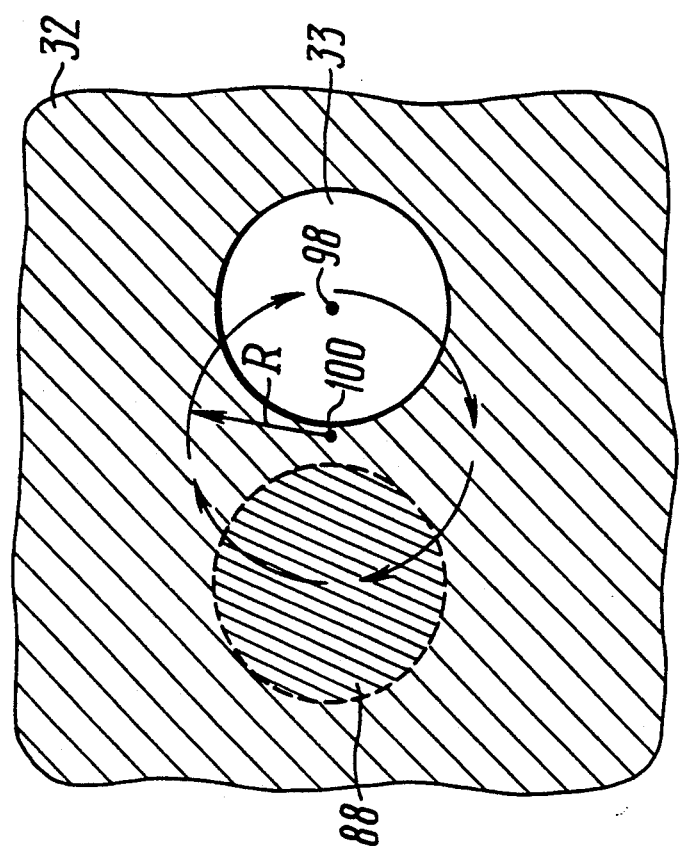
FIG. 5 (a,b) is an enlarged sectional view taken along line IV—IV in FIG. 1(a,b) or FIG. 4 which shows a part of a diaphragm.
Figure 5A:
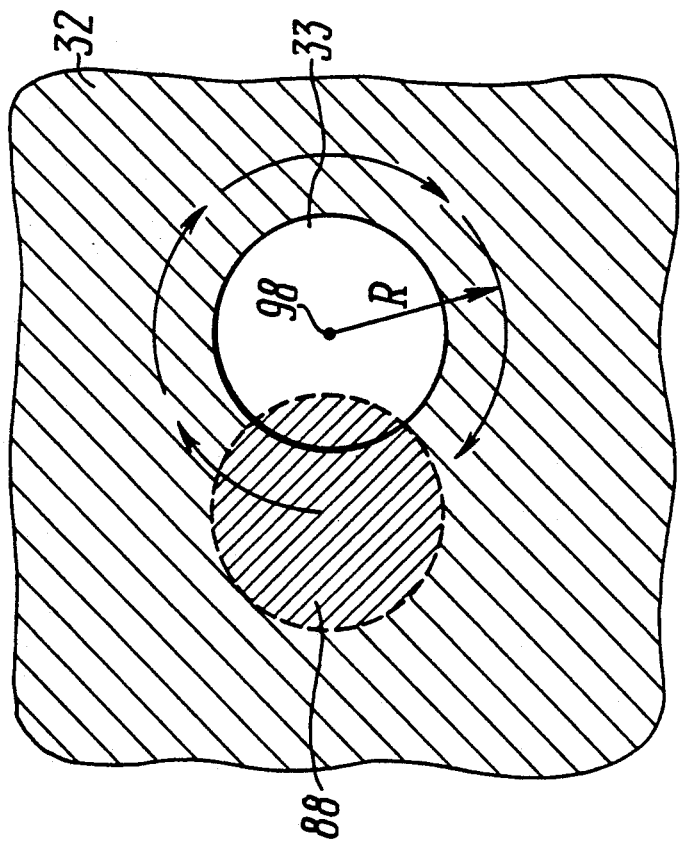

A high-frequency sine wave modulated with a video signal fed from video signal supply 64 is applied to deflecting plate 26 (FIGS. 1(a,b), 2) and the same voltage is applied to deflecting plates 20, 22, 24, 26 with a phase shift of 90°, 180° and 270°, respectively. One of the embodiments of the invention is realized by means of the electric circuit shown in FIG. 3. As a result electron beam 13 is deflected in such a manner that the cross-section of electron beam 13, which is shown in FIG. 2 as a shaded circlet 87, will rotate in a plane drawn perpendicularly with respect to optical axis 15 about a center 96 in optical axis 15 (FIG. 1(a,b)) if electron beam 13 is aligned with optical axis 15 to describe a circle of a radius "r" which is determined by amplitude of the modulating video signal. With such an alignment, which attests to the absence of a thermal drift of hairpin cathode 10, the cross-section of electron beam 13 shown as shaded circle 88 in FIG. 5 (a) rotates about center 98 of a circle with a radius "R" with respect to aperture 33 of diaphragm 32 (FIGS. 1(a,b), 5(a)). Radius "R" is also determined by amplitude of the video signal. In this case a signal from pickup 44 sensing position of electron beam 13 with respect to optical axis 15 is equal to zero. This is explained by the fact that inductive pickup 44 is tuned in resonance with the carrier frequency modulated with a video signal, and the electron beam current downstream diaphragm 32 is not modulated with a carrier frequency when the position of center 98 of rotation of electron beam 13 with respect to aperture 33 of diaphragm 32 is as shown in FIG. 5 (a).

If electron beam 13 deviates from optical axis 15 because of a thermal drift of cathode 10 or in view of any other deviation of parameters of the electron gun formed by cathode 10, focusing electrode 12 and anode 16, its position with respect to optical axis 15 must be corrected by means of electromagnetic control system 46, 48. In this case a center 100 of rotation of electron beam 13 is offset from a center 98 in optical axis 15 as shown in FIG. 5 (b), and electron beam 13 rotates so that its cross-section 88 describes a circle with the same radius "R" as in FIG. 5 (a) but in an offset position with respect to the center 98 of aperture 33 of diaphragm 32. In this case electron beam current downstream diaphragm 32 is modulated with the carrier frequency, and a signal appears at the output of inductive pickup 44 to react to the drift of electron beam 13. In one of the embodiments (FIG. 1a), a signal from pickup 44 goes through amplifier 45, rectifier 47, and analog to digital converter 49 to the input of control unit 50. This input receives information about an amplitude of electron beam displacement with respect to optical axis 15. But the signal from pickup 44 goes to the other input of control unit 50 through amplifier 45, phase detector 56 applying a signal from deflecting plate 24 and analog to digital converter 58 also. This channel gives information regarding the direction of the electron beam displacement with respect to optical axis 15. In another embodiment shown in FIG. 1b, the signal from pickup 44 goes to error detector 56 applying a signal from deflecting plate 24. Two outputs of error detector 56 are connected to two inputs of control unit 50. These inputs receive information about both the amplitude of the electron beam displacement with respect to optical axis 15 and the direction of this displacement. Electron beam 13 drifts in axes X and Y (FIG. 5), and control unit 50 generates output signals for each axis of deflection of electron beam 13 which are fed to variable power supplies 52, 54 to vary current in coils 46, 48 of the electromagnetic control system in such a manner as to compensate for a deviation of electron beam 13 from optical axis 15. It should be noted that rotation of electron beam with respect to aperture 33 of diaphragm 32 allows correction of position of electron beam 13 with respect to optical axis to be made in both axis X and Y. Commands from a built-in programmable control means (not shown) cause control unit 50 to generate output signals when a signal is received from pickup 44 in the following manner.

The embodiment in FIG. 1a is only using information about the amplitude of the electron beam displacement following a command from the built-in programmable control means. An output signal from control unit 50 first goes to variable power supply 52 of coil 46 of the electromagnetic control system. This output signal controls adjustment of position of electron beam 13 with respect to optical axis 15 in X-axis (FIG. 5). As a result, electron beam 13 will be in a certain new position with respect to optical axis 15 in X-axis. This new position corresponds to a local minimum of the input signal. The built-in programmable control means then gives a command for generation of a next output signal of control unit 50 which goes to variable power supply 54 of coil 48 of the electromagnetic control system. This output signal controls adjustment of position of electron beam 13 with respect to optical axis 15 in Y-axis (FIG. 5). As a result, electron beam 13 will be in a certain new position with respect to optical axis 15 in Y-axis. If an amplitude signal from pickup 44 is equal to zero after the above-described control steps, electron beam 13 is in the correct position with respect to optical axis 15, and the control cycle is over. If there is an amplitude signal from pickup 44, which is received at the input of control unit 50, the built-in programmable control means again causes generation of output signals resulting in variation of power supply of coils 46, 48 of the electromagnetic control system to bring electron beam 13 to a correct position with respect to optical axis 15. It is understood that these control steps are repeated until the output signal of pickup 44 becomes equal to zero.

In the other embodiment (FIG. 1b) with using phase detector the input signal of control unit 50 having information not only about the amplitude of displacement of the electron beam with respect to optical axis but the information about the displacement direction of this electron beam. In this case control unit 50 sends the final signals precisely adjusting the electron beam to the variable power supply, and can be implemented as an analog feedback loop.

In FIG. 1a the embodiment shown in FIG. 4 functions in the same manner as that shown in FIG. 3. The difference here resides in the fact that the full current of electron beam 13 is also controlled. A reference value of full current necessary for normal quality of image on laser screen 14 is generated in control unit 50 by any appropriate known means and represents a preset value. This reference value is compared in control unit 50 with a signal arriving from electron current pickup 80 (FIG. 4) to the input of control unit 50 via amplifier 90, rectifier 92, and analog to digital converter 94. If the signal from pickup 80 is equal to the reference value, no output signal is generated by control unit 50. When electron beam current becomes different from the preset reference value in control unit 50, the difference between the signal from pickup 80 and this reference value is fed to output 53 of control unit 50 connected to variable filament voltage supply 76 and variable bias voltage supply 78, both of high-voltage supply 74. As a result, the electron beam current is adjusted to be equal to the preset reference value to thereby control the full current of electron beam 13. This greatly enhances the image quality.

Non-limiting embodiments of an apparatus for producing an image in a laser screen cathode-ray tube according to the invention have been described. It will be apparent to those skilled in the art that various modifications, substitutes and additions may be made in the above-described embodiments, which are well known to those skilled in the art. Thus a diaphragm with a circular aperture may be replaced with any other diaphragm having an aperture of any regular shape in carrying out the method according to the invention with the use of any pickup for sensing position of electron beam of a type other than that described above. All such and other changes and modifications do not go beyond the spirit and scope of the attached claims.

We claim:

1. An apparatus for controlling an electron beam, said apparatus comprising:
    a cathode-ray tube having an optical axis;
    a cathode means positioned in said cathode ray tube for generating an electron beam for propagation along said optical axis, said electron beam having a cross-section;
    an electron beam current modulator positioned along said optical axis down stream from the cathode means, said modulator having at least three deflecting plates and a diaphragm having an aperture of a regular shape, said aperture surrounding said optical axis;
    said deflecting plates of said modulator being positioned around, and symmetrically with respect to said optical axis of said cathode-ray tube;
    an electromagnetic control system provided between said cathode means and said deflecting plates of said modulator;

a video signal source;

a carrier generator having an input connected to said video signal source and an output;

a phase shifter having an input and outputs;

said input of said phase shifter being connected to said output of said carrier generator;

said outputs of said phase shifter being connected to said deflecting plates of said modulator, whereby said cross-section of said electron beam is rotated at a frequency of said carrier generator in a plane drawn perpendicularly with respect to said optical axis to describe a circle;

an inductive pickup for sensing position of the center of said circle which is described by said rotation of said cross-section of said electron beam with respect to said optical axis and for producing a signal if said center has offset from said optical axis;

a control unit having an input and an output;

said input of said control unit being connected to said pickup for sensing deviation from the center of said circle;

said output being connected to said electromagnetic control system; and a laser screen mounted at the output end of said cathode-ray tube.

2. The apparatus of claim 1, wherein said aperture of said diaphragm is circular, the center of said aperture being aligned with said optical axis, and wherein said pickup comprises an inductive pickup tuned in resonance with said frequency of said carrier generator.

3. The apparatus of claim 1, wherein said electronic control system has a pair of electromagnetic adjusting coil systems, each coil system being connected to said output of said control unit.

4. The apparatus of claim 2, wherein said electronic control system has a pair of electromagnetic adjusting coil systems, each coil system being connected to said output of said control unit.

5. The apparatus of claim 1 comprising:

an electron beam current pickup positioned between said deflecting plates and said diaphragm of said modulator;

a variable power supply connected to said cathode means having a control input; and wherein said control unit has an auxiliary input and an auxiliary output, said auxiliary input being connected to said electron beam current pickup and said auxiliary output being connected to said control input of said variable power supply of said cathode means.

6. The apparatus for producing an image in a laser screen cathode-ray tube of claim 2, said apparatus comprising:

an electron beam current pickup provided between said deflecting plates and said diaphragm of said modulator;

a variable power supply connected between said cathode means and said control unit, said variable power supply having a control input;

said control unit having an auxiliary input and an auxiliary output, said auxiliary input being connected to said electron beam current pickup and said auxiliary output being connected to said control input of said variable power supply of said cathode means.

7. The apparatus for producing an image in a laser screen cathode-ray tube of claim 3, said apparatus comprising:

an electron beam current pickup provided between said deflecting plates and said diaphragm of said modulator;

a variable power supply connected between said cathode means and said control unit, said variable power supply having a control input; and wherein said control unit has an auxiliary input and an auxiliary output, said auxiliary input being connected to said electron beam current pickup and said auxiliary output being connected to said control input of said variable power supply of said cathode means.

8. An apparatus for producing an image in a laser screen cathode-ray tube of claim 4, said apparatus comprising:

an electron beam current pickup provided between said deflecting plates and said diaphragm of said modulator;

a variable power supply connected to said cathode means having a control input; and wherein said control unit has an auxiliary input and an auxiliary output, said auxiliary input being connected to said electron beam current pickup and said auxiliary output being connected to said control input of said variable power supply of said cathode means.

9. An apparatus of claim 1, wherein said modulator has two pairs of opposed deflecting plates, a first resonance transformer and a second resonance transformer; the primary winding of said first resonance transformer being connected to said carrier generator; the primary winding of said second resonance transformers being connected to said phase shifter; with the secondary windings of said resonance transformers being connected to said pairs of opposed deflecting plates of said modulator.

10. An apparatus of claim 4, wherein said modulator has two pairs of opposed deflecting plates, a first resonance transformer and a second resonance transformer; the primary winding of said first resonance transformer being connected to said carrier generator; the primary winding of said second resonance transformer being connected to said phase shifter; and the secondary windings of said resonance transformers being connected to said pairs of opposed deflecting plates of said modulator.

11. An apparatus for controlling an electron beam, said apparatus comprising:

a cathode-ray tube having an optical axis;

a cathode means for generating an electron beam for propagation along said optical axis, said electron beam having a cross-section;

an electron beam current modulator provided along said optical axis between said cathode means and said laser screen, said modulator having two pairs of opposed deflecting plates and a diaphragm having a circular aperture with the center of said aperture in said optical axis;

said deflecting plates of said modulator being positioned around, and symmetrically with respect to said optical axis of said cathode-ray tube;

an electromagnetic control system provided between said cathode means and said deflecting plates of said modulator;

a video signal source;

a carrier generator having an input connected to said video signal source and two outputs;

a phase shifter having two inputs and two outputs;

said inputs of said phase shifter being connected to said outputs of said carrier generator;

a first resonance transformer having a primary winding and a secondary winding and a second resonance transformer having a primary winding and a secondary winding;

said primary winding of said first resonance transformer being connected to said carrier generator;

said primary winding of said second resonance transformer being connected to said phase shifter;

said secondary windings of said resonance transformers being connected to said pairs of opposed deflecting plates of said modulator;

said outputs of said phase shifter and said outputs of said carrier generator being connected to said deflecting plates of said modulator, whereby said cross-section of said electron beam is rotated at a frequency of said carrier generator in a plane drawn in parallel with said aperture of said diaphragm to describe a circle;

an inductive pickup for sensing an offset of the center of said circle which is described by said rotation of said cross-section of said electron beam with respect to said optical axis, said pickup being tuned in resonance with said frequency of said carrier generator.

a control unit having an input and an output;

said input of said control unit being connected to said pickup for sensing position of the center of said circle; and said output being connected to said electromagnetic control system.

12. An apparatus of claim 11, said apparatus comprising:

an electron beam current pickup provided between said deflecting plates and said diaphragm of said modulator;

a variable power supply connected to said cathode means having a control input;

said control unit having an auxiliary input and an auxiliary output, said auxiliary input being connected to said electron beam current pickup and said auxiliary output being connected to said control input of said variable power supply of said cathode means.

13. A method for producing an image in a laser screen cathode-ray tube having an optical axis comprising producing an electron beam, directing said electron beam to said laser screen along said optical axis, modulating current of said electron beam in a modulator comprising deflecting plates and a diaphragm having an aperture, said method comprising:

causing a cross-section of said electron beam to rotate in a plane drawn perpendicularly with respect to said optical axis in a zone upstream said diaphragm;

sensing the position of a center of rotation of said cross-section of said electron beam with respect to said optical axis of said tube; and adjusting the position of said longitudinal axis of said electron beam with respect to said optical axis when said center of rotation of said cross-section of said electron beam is offset with respect to said optical axis.

14. The method for producing an image in a laser screen cathode-ray tube of claim 13 wherein said rotation of said cross section of said electron beam occurs during the step of modulating current of said electron beam in a modulator.

* * * * *